(12) United States Patent
Aldous et al.

(10) Patent No.: US 6,654,722 B1
(45) Date of Patent: Nov. 25, 2003

(54) VOICE OVER IP PROTOCOL BASED SPEECH SYSTEM

(75) Inventors: Anne M. Aldous, Davie, FL (US); Joseph Celi, Jr., Boca Raton, FL (US); Brett Gavagni, Sunrise, FL (US); Kyriakos Leontiades, Boca Raton, FL (US); Bruce D. Lucas, Yorktown Heights, NY (US); David E. Reich, Jupiter, FL (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 09/596,769

(22) Filed: Jun. 19, 2000

(51) Int. Cl.$^7$ ............................................... G10L 11/00
(52) U.S. Cl. .................................................. 704/270.1
(58) Field of Search ........................... 704/270, 270.1, 704/275, 276; 370/237; 379/88.02, 221.01, 219; 709/204

(56) References Cited

U.S. PATENT DOCUMENTS

| | | | | |
|---|---|---|---|---|
| 5,581,600 A | * | 12/1996 | Watts et al. | 379/88.02 |
| 5,881,135 A | * | 3/1999 | Watts et al. | 379/88.02 |
| 5,916,302 A | * | 6/1999 | Dunn et al. | 709/204 |
| 5,933,490 A | * | 8/1999 | White et al. | 379/221.01 |
| 5,983,190 A | * | 11/1999 | Trower et al. | 704/276 |
| 6,014,437 A | * | 1/2000 | Acker et al. | 379/219 |
| 6,154,445 A | * | 11/2000 | Farris et al. | 370/237 |
| 6,269,336 B1 | * | 7/2001 | Ladd et al. | 704/270 |

* cited by examiner

Primary Examiner—David D. Knepper
(74) Attorney, Agent, or Firm—Akerman Senterfitt

(57) ABSTRACT

A VoIP-enabled speech server can include a speech application which can be configured to communicate with a VoIP telephony gateway server over a VoIP communications path. The VoIP-enabled speech server can also include a VoIP-compliant call control interface to the VoIP telephony gate server, the VoIP-compliant call control interface establishing the VoIP communications path. In operation, the speech application can receive VoIP-compliant packets from the VoIP telephony gateway server over the VoIP communications path. Subsequently, digitized audio data can be reconstructed from the VoIP-compliant packets, and the digitized audio data can be speech-to-text converted. Additionally, text can be synthesized into digitized audio data and the digitized audio data can be encapsulated in VoIP-compliant packets which can be transmitted over the VoIP communications path to the telephony gateway server.

21 Claims, 3 Drawing Sheets

VOICE OVER IP PROTOCOL BASED SPEECH SYSTEM

BACKGROUND OF THE INVENTION

1. Technical Field

This invention relates to the field of voice recognition and more particularly to a speech application for use in a Voice over IP protocol network.

2. Description of the Related Art

LAN telephony, which means "the integration of telephony and data services provided by packet-switched data networks," is the technology that takes person-to-person communication to a high new level and associated costs to a lower level. LAN telephony enables a more flexible and cost-efficient use of many applications, for example automated call distribution, interactive voice response, voice logging, etc. This is in contrast to the relatively limited integration offered by the current voice/data integration paradigm, computer-telephony integration in which voice traffic is kept separate from data traffic and carried over circuit-switched links. Whereas the old paradigm for integrating data and voice has been to use the circuit-switched telephony fabric for data communications, the obvious drawbacks of the relatively low bandwidth available to data traffic, the inefficiency of circuit-switched data communications due to the "bursty" nature of data traffic, and the limited voice/data integration possibilities have led to present topologies in which IP data servers are bundled with proprietary PBXs or voice circuit switches in order to provide a loose integration between circuit and packet-switched networks and voice is carried by the circuit-switched network.

One of the most common uses of LAN telephony is in the enterprise Internet/Intranet environment, referred to as IP telephony. The Voice over IP ("VoIP") protocol is the protocol upon which voice traffic can be transmitted across IP networks. In a VoIP network, analog speech signals received from an analog speech audio source, for example a PSTN or a microphone, are digitized, compressed and translated into IP packets for transmission over an IP network. Several well-known protocols implement the VoIP protocol specification including H.323, Session Initialization Protocol ("SIP") and Master Gateway Control Protocol ("MGCP").

A common application for IP telephony is the integration of voice mail ("v-mail") and electronic mail ("e-mail"). Another application can include voice logging by financial or emergency-response organizations. Additionally, automated call distribution ("ACD") can be facilitated whereby an ACD server performs value-based queuing of incoming telephone calls. Finally, interactive voice response systems can incorporate IP telephony in which responses are preprogrammed in a server as a workflow component. Still, speech recognition and speech synthesis applications ("speech applications") have lagged in the use of IP telephony.

In particular, speech applications operate on real-time audio signals which cannot tolerate latencies associated with traditional data communications. As such, where speech applications have been incorporated in an IP telephony topology, the speech applications have been closely integrated with IP telephony server in order to preclude a negative impact from network based latencies. Accordingly, the design and development of such IP telephony enabled speech applications have been closely linked to the proprietary nature of the IP telephony server.

The tight linkage between the speech application and the IP telephony server substantially limits both the design and the extensibility of the speech application. Specifically, in the present paradigm the speech application design must incorporate functionality directly related to the chosen protocol for transporting packetized voice data to a speech recognition system and from a speech synthesis system. The development of a superior voice transport protocol, by nature of the tight linkage between the IP telephony server and the speech application, can compel the redesign of the speech application. Accordingly, there exists a need for a speech a VoIP-based speech system in which the design and implementation of the speech application remains separate from the design and implementation of the IP telephony system.

SUMMARY OF THE INVENTION

It is an object of the present invention to provide a VoIP-based speech system in which the design and implementation of the speech application remains separate from the design and implementation of the IP telephony system. It is a further object of the present invention to provide a VoIP-enabled speech server which can receive audio input from the IP telephony system over a VoIP network. It is yet another object of the present invention to provide a method for coupling a speech application to a telephony gateway server in a VoIP network. Finally, it is an object of the present invention to provide each of the VoIP-based speech system, the VoIP-enabled speech server and the method for coupling the speech application to the telephony gateway server using standards-based interfaces to the VoIP network, the t server and the speech application.

These and other objects of the present invention are accomplished in a VoIP-based speech system including: a VoIP telephony gateway server; at least one speech server, each speech server containing a VoIP-enabled speech application; a VoIP-compliant call control interface between the VoIP telephony gateway server and the speech server; and, a VoIP communications path between the VoIP telephony gateway-server and the speech application in the at least one speech server. In the VoIP-based speech system, the VoIP telephony gateway server and the speech application can establish the VoIP communications path through the VoIP-compliant call control interface.

In operation, the VoIP telephony gateway server can receive audio signals from a telephony interface, digitize the audio signals into digitized audio data, compress the digitized audio data into VoIP-compliant packets, and transmit the VoIP-compliant packets to the speech application in the at least one speech server through the VoIP communications path using the VoIP protocol. Correspondingly, the speech application can receive the VoIP-compliant packets, reconstruct the digitized audio data from the VoIP-compliant packets, and speech-to-text converting the digitized audio data. In addition, the speech application can synthesize text into digitized audio data, encapsulate the digitized audio data in VoIP-compliant packets and transmit the VOIP-compliant packets through the VoIP communications path to the VoIP telephony gateway server. Subsequently, the VoIP telephony-gateway. server can receive the VoIP-compliant packets, reconstruct the digitized audio data from the VoIP-compliant packets, and transmit the digitized audio data through the telephony interface.

In one aspect of the present invention, the VoIP telephony server can include a telephony interface and a VoIP Gatekeeper. The VoIP Gatekeeper can receive a voice call through the telephony interface, and responsively, the VoIP Gatekeeper can choose a speech server from among the speech servers. Once a speech server has been chosen, the VoIP Gatekeeper can alert the VoIP-enabled speech application in the chosen speech server that the voice call has been received.

In another aspect of the present invention, the speech server can include a speech recognition engine; a text-to-speech engine; a call control interface for establishing a voice call connection through the VoIP telephony gateway server; and, an audio data path. Notably, the audio data path can stream audio data through the established voice call connection to the speech recognition engine. Similarly, the audio data path can stream audio data through the established voice call connection from the text-to-speech engine.

In yet another aspect of the present invention, the speech application can be a speech browser. The speech browser can retrieve Web content responsive to voice commands received through the VoIP communications path. Also, the speech browser can speech synthesize the retrieved Web content into audio data. Finally, the speech browser can transmit the audio data through the VoIP communications path to the VoIP telephony gateway server. Significantly, the Web content can be a VoiceXML document.

Preferably, the speech server can be implemented using standards-based interfaces to the VoIP telephony gateway server, the VoIP communications path, and the speech application. Specifically, the speech server can include a speech recognition engine; a text-to-speech engine; a JSAPI speech interface; a JTAPI telephony interface; and a JMF media interface. The JTAPI telephony interface can establish a voice call connection for transporting digital audio data between the Ages telephony gateway server and the speech application. The JMF media interface can establish a data path for transporting the digital audio data between the speech application and the voice call connection. The JSAPI speech interface can communicate the digitized audio data from the speech application to the speech recognition engine. Similarly, the JSAPI speech interface can communicate speech synthesized audio data from the text-to-speech engine to the speech application.

The present invention can also be embodied in a VoIP-enabled speech server which can include a speech application which can be configured to communicate with a VoIP telephony gateway server over a VoIP communications path. The VoIP-enabled speech server can also include a VoIP-compliant call control interface to the VoIP telephony gateway server, the VoIP-compliant call control interface establishing the VoIP communications path. In operation, the speech application can receive VoIP-compliant packets from the VoIP telephony gateway server over the VoIP communications path. Subsequently, digitized audio data can be reconstructed from the VoIP-compliant packets, and the digitized audio data can be speech-to-text converted. Additionally, text can be synthesized into digitized audio data and the digitized audio data can be encapsulated in VoIP-compliant packets which can be transmitted over the VoIP communications path to the telephony gateway server.

In another aspect of the VoIP-enabled speech server, the VoIP-enabled speech server can include a speech recognition engine, a text-to-speech engine and an audio data path. The audio data path can stream audio data through the established voice call connection to the speech recognition engine. Also, the audio data path can stream audio data through the established voice call connection from the text-to-speech engine.

Preferably, the speech application is a speech browser. The speech browser can retrieve Web content responsive to voice commands received through the VoIP communications path. The speech browser can also speech synthesize the retrieved Web content into audio data. Subsequently, the speech browser can transmit the audio data through the VoIP communications path to the VoIP telephony-gateway-server. Significantly, the Web content can be a VoiceXML document.

Preferably, the VoIP-enabled speech server can be implemented using standards-based interfaces to the VoIP telephony gateway server, the VoIP communications path, and the speech application. Specifically, the VoIP-enabled speech server can include a JTAPI telephony interface for establishing a voice call connection for transporting digital audio data between the telephony gateway server and the speech application. Additionally, the VoIP-enabled speech server can have a JMF media interface for establishing a data path for transporting the digital audio data between the speech application and the voice call connection. Finally, the VoIP-enabled speech server can have a JSAPI speech interface both for communicating the digitized audio data from the speech application to the speech recognition engine, and for communicating speech synthesized audio data from the text-to-speech engine to the speech application.

Finally, the present invention can include a method for coupling a speech application to a telephony gateway server in a VoIP network. The method can include the steps of establishing a VoIP communications path with the VoIP telephony gateway server and configuring the speech application to communicate with the telephony gateway server over the established VoIP communications path. Additionally, VoIP-compliant packets can be received from the telephony gateway server over the established VoIP communications path. Digitized audio data can be reconstructed from the VoIP-compliant packets and, subsequently, the digitized audio data can be speech-to-text converted. Additionally, the method can include the steps of synthesizing text into digitized audio data; encapsulating the digitized audio data in VoIP-compliant packets; and, transmitting the VoIP-compliant packets over the VoIP communications path to the telephony gateway server.

In the preferred embodiment, the method can further include the steps of retrieving Web content responsive to speech recognized voice commands received through the VoIP communications path; synthesizing the retrieved Web content into audio data; and, transmitting the audio data through the VoIP communications path to the telephony gateway server. Significantly, the Web content can be a VoiceXML document.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

The present invention is a Voice over IP ("VoIP") based speech system in which a speech server can be coupled to a telephony gateway server in a VoIP network. The telephony gateway server can receive voice calls from an external telephone network, for example a public switched telephone network ("PSTN"), an integrated services digital network ("ISDN") and the like. The speech server can include a speech application which can receive real-time speech input through a VoIP communications path originating from voice calls in the telephony gateway server. Likewise, the speech application can transmit speech synthesized audio data through the VoIP communications path to the telephony gateway server and ultimately to a termination point in the external telephone network. Significantly, the speech application can receive voice browser commands through the voice call, responsive to which the speech application can retrieve Web content from external Web servers. Additionally, the Web-content can be speech synthesized and transmitted through the VoIP communications path, also as part of the voice call. In the preferred embodiment, the Web content can be a VoiceXML document.

Figure 1:
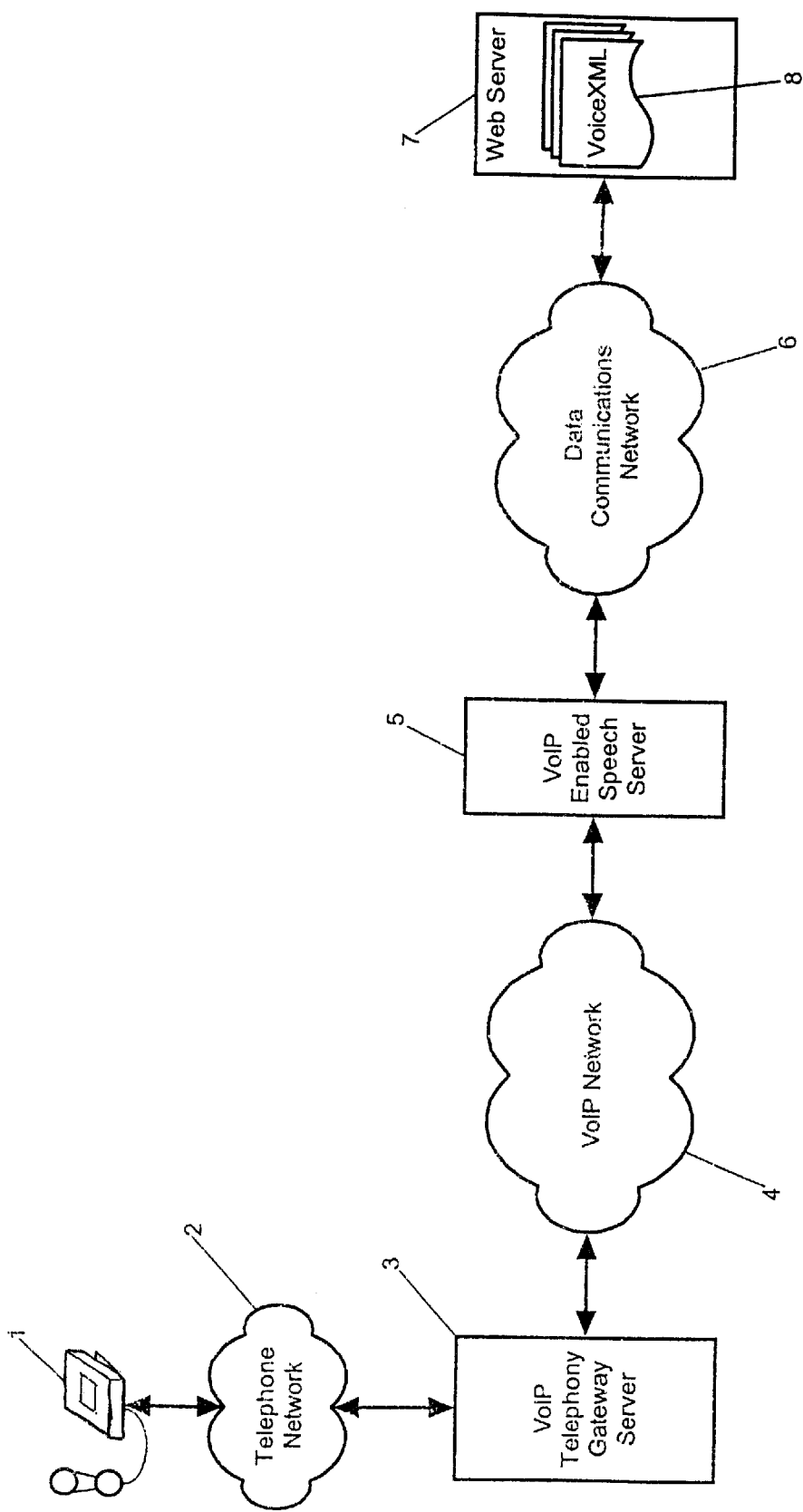
FIG. 1 is a schematic illustration of a VoIP-based speech system according to the present invention.

FIG. 1 illustrates a VoIP-based speech system according the preferred embodiments. Notably, as is well-known in the art, the VoIP specification can be implemented using several published standards, for instance H.323, SIP and MGCP. However, the present invention implements H.323 although the invention is not limited with regard to the particular implementation of VoIP. As shown in FIG. 1, in operation, a user can initiate a voice call using telephone device 1. The voice call can attempt to connect with a VoIP telephony gateway server 3 through a telephone network 2, for instance a PSTN or ISDN. The VoIP telephony gateway server 3 can translate the address of the intended recipient of the voice call to the IP address of a device residing in the VoIP network 4, in this instance a VoIP Enabled Speech Server 5. Subsequently, the VoIP telephony gateway server 3 can notify the VoIP Enabled Speech Server 5 of the voice call which the VoIP Enabled Speech Server 5 can accept. Upon accepting the voice call, the VoIP Enabled Speech Server 5 can establish a VoIP communications path between the VoIP telephony gateway server 3 and the VoIP Enabled Speech Server 5 such that VoIP-compliant packets of audio data can be transported between the VoIP telephony gateway server 3 and the VoIP Enabled Speech Server 5. In this manner, audio data originating in the telephone device 1 can be received and processed in the VoIP Enabled Speech Server 5. Likewise, audio data originating in the VoIP Enabled Speech Server 5 can be transmitted back to the telephone device 1.

Notably, in the preferred embodiment, the VoIP Enabled Speech Server 5 can accept voice commands originating in the telephone device 1 for retrieving Web content from a Web server 7 in a data communications network 6. Specifically, the Web content 8 can be a VoiceXML document 8. In response, the VoIP Enabled Speech Server 5 can retrieve the VoiceXML document 8 from the Web server 7 and can synthesize audio data according to instructions contained in the VoiceXML document 8. Subsequently, the synthesized audio data can be transported across the VoIP network 4 to the VoIP telephony gateway server 3 and ultimately to the telephone device 1.

Figure 2:
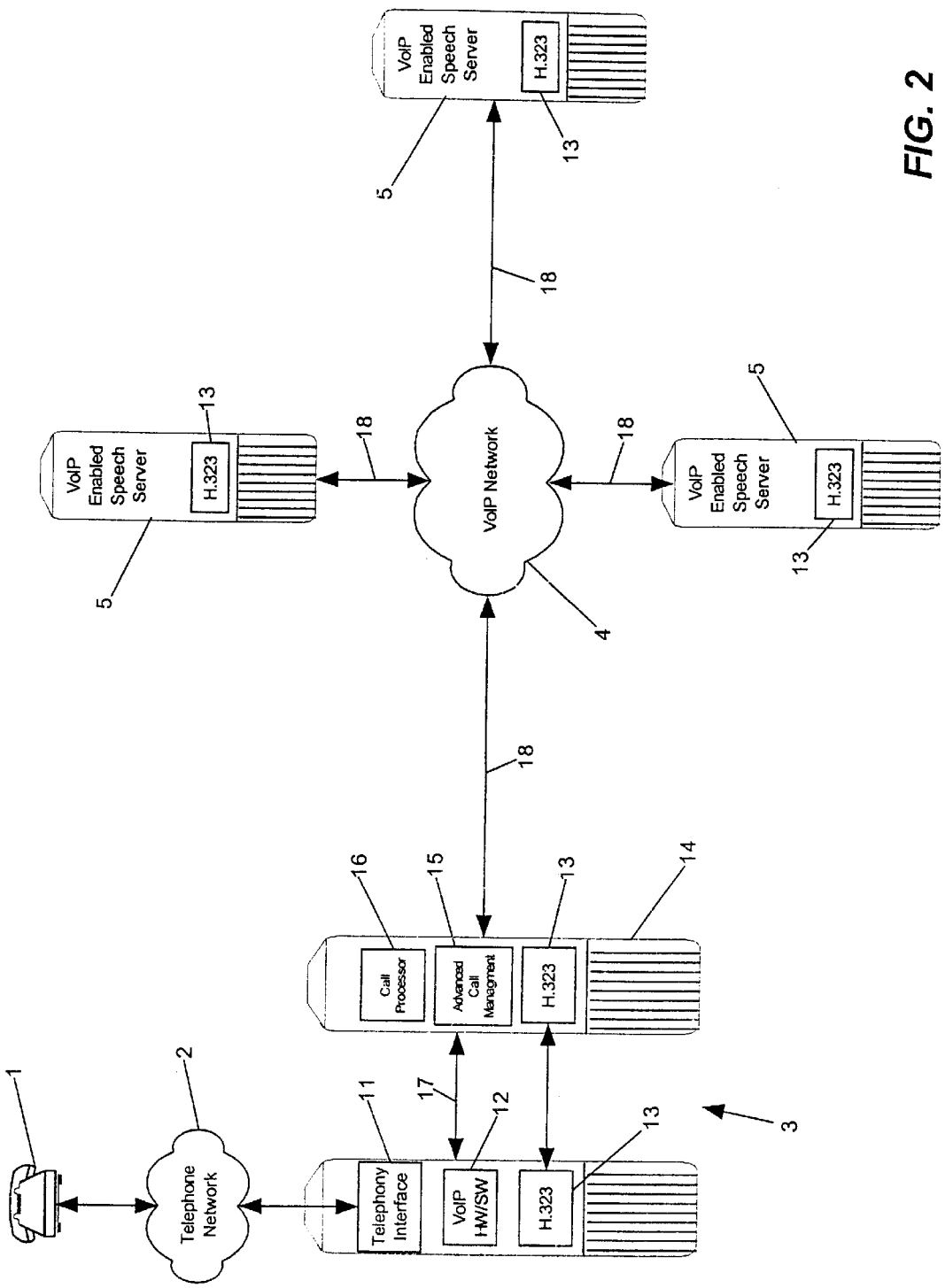
FIG. 2 is a diagram of a preferred architecture for the VoIP telephony gateway server of FIG. 1.

FIG. 2 illustrates the VoIP network 4 of FIG. 1 and contains a more detailed illustration of the VoIP telephony gateway server 3. As shown in FIG. 2, the VoIP telephony gateway server 3 can receive the voice call from the telephone device 1 through the telephone network 2 into a telephony interface 11. The telephony interface 11 can perform address translation of the address of the intended recipient of the voice call and can direct the voice call accordingly. Specifically, in the, preferred embodiment, a VoIP Gatekeeper 14 is incorporated in the VoIP telephony gateway server 3 in order to provide call management functionality to the VoIP telephony gateway server 3. In particular, the VoIP Gatekeeper 14 can perform load-balancing in order to ensure the high-availability of VoIP Enabled Speech Servers 5 able to receive the voice call.

Hence, upon receiving a voice call in the telephony interface 11, call control can be passed to the VoIP Gatekeeper 14 through call control interfaces 13. Notably, the VoIP Gatekeeper 14 can communicate with other components of the VoIP telephony gateway server 3 through data path 17. Moreover, a call control interface 13 can be included in the VoIP Gatekeeper 14 in order to control the establishment, progress and termination of voice calls processed through the VoIP Gatekeeper 14. Because the preferred implementation of VoIP is an implementation of the RTP-based H.323 standard, the call control interfaces 13 are H.323-based call control interfaces.

Subsequently, the control having been passed to the VoIP Gatekeeper 14, call processor 16 using advanced call management functions 15 can examine the status of each VoIP Enabled Speech Server 5 in the VoIP Network 4 and identify a VoIP Enabled Speech Server 5 in the VoIP network 4 best suited to receive the voice call. As a result, the VoIP Gatekeeper can choose a suitable VoIP Enabled Speech Server 5 and can alert the chosen VoIP Enabled Speech Server 5 of the voice call.

Upon receiving an alert, the chosen VoIP Enabled Speech Server 5 can establish a VoIP communications path 18 between the VoIP telephony gateway server 3 and the VoIP Enabled Speech Server 5 through which VoIP-compliant packets can be transmitted. Subsequently, the telephony interface 11 can digitize audio signals contained in the voice call into digitized audio data, compress the digitized audio data into VoIP-compliant packets, and transmit the VoIP-compliant packets to the chosen VoIP Enabled Speech Server 5 through the VoIP communications path 18 using the VoIP protocol.

Significantly, the present invention is not limited to the particular arrangement of the VoIP telephony gateway server 3. In particular, the depiction of the VoIP Gatekeeper 14 as a separate entity from the remaining components of the VoIP telephony gateway server 3 is not meant to limit the invention as such. Rather, the placement of the VoIP Gatekeeper 14 in FIG. 2 is intended for illustrative purposes only. Additionally, the scope of the invention with regard to the VoIP telephony gateway server 3 in combination with the VoIP Gatekeeper should be limited only inasmuch as the VoIP telephony gateway server 3 can receive a voice call and the VoIP Gatekeeper, 14 can perform call management by identifying a suitable terminus for the voice call in the VoIP network 4.

Figure 3:
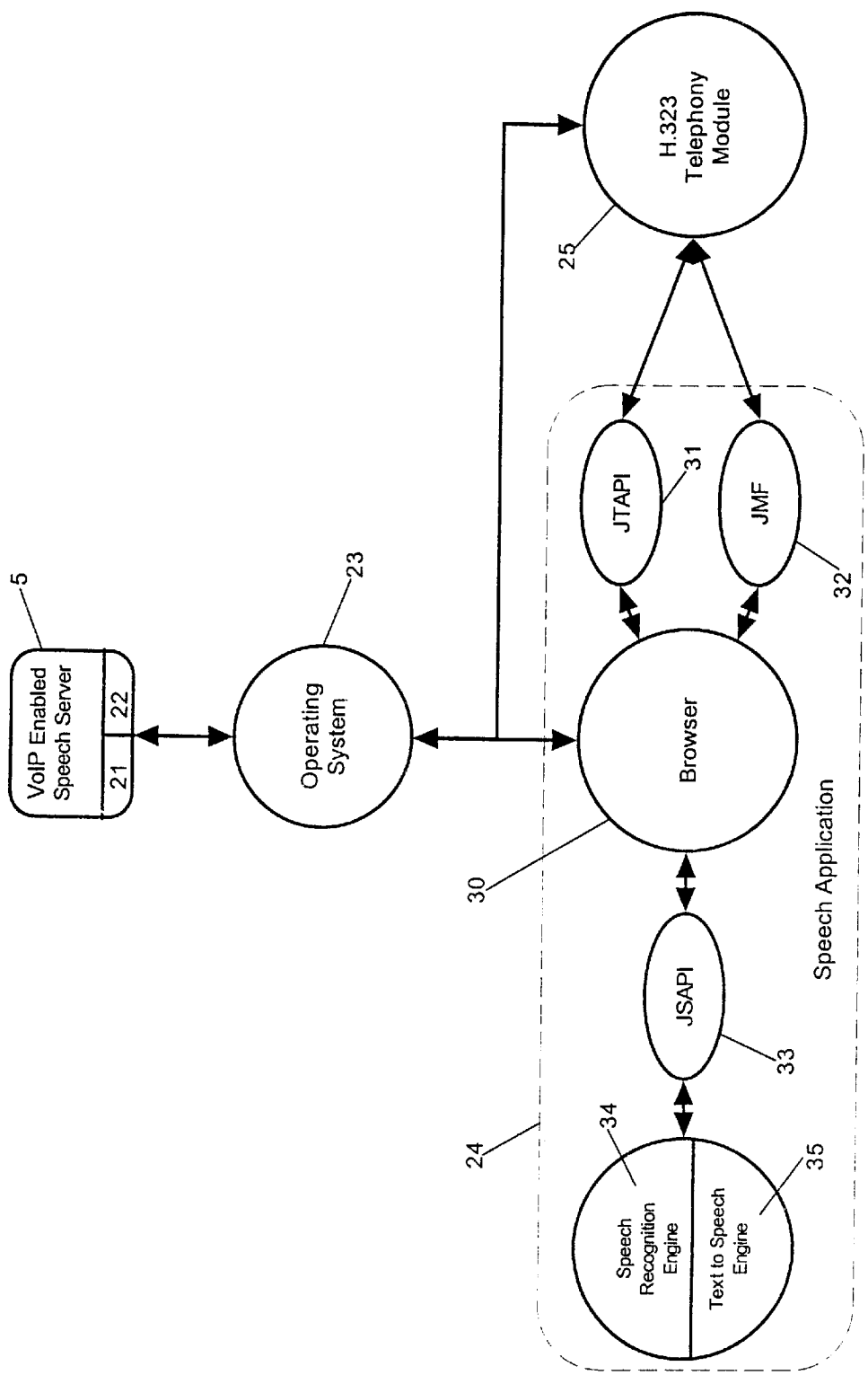
FIG. 3 is a diagram of a preferred architecture for the speech server of FIG. 1.

FIG. 3 illustrates a preferred architecture for the VoIP Enabled Speech Server 5 of FIG. 1. The VoIP Enabled Speech Server 5 can be implemented in a conventional network server which traditionally includes a central processing unit (CPU), and internal memory devices, such as random access memory (RAM) 21, and fixed storage 22 for example a hard disk drive (HDD). Because the VoIP Enabled Speech Server 5 is speech-enabled, the VoIP Enabled Speech Server 5 also includes audio circuitry (not shown) so as to provide an audio processing capability to the VoIP Enabled Speech Server 5.

The VoIP Enabled Speech Server 5 can store in the fixed storage 22 an operating system 23 upon which various applications programs can execute. Additionally, the fixed storage 22 can store therein a speech application 24 and a VoIP telephony module 25. The operating system 23 can include any suitable operating system, for example Microsoft Windows NT®, Sun Solaris® or Debian Linux. Notably, the invention is not limited in regard to the arrangement of speech application 24 and telephony module 25 in relation to the operating system 23. Rather, each can be integrated with the other in various combinations. For example, the VoIP telephony module 25 can be integrated in the operating system 23. Alternatively, the VoIP telephony module 25 can remain independent of the operating system 23.

Also, the invention is not limited to the storage location of the VoIP telephony module 25, the speech application 24 and the components thereof. Rather, the present invention can be implemented in a more complex distributed system in which the various components reside in multiple network servers and execute in process address spaces remote from one another, each application communicating with other applications through well-known interprocess communication mechanisms, for example TCP/IP. Upon the bootstrap of the VoIP Enabled Speech Server 5, the operating system 23 can load into RAM 21. Subsequently, both the speech application 24 and the VoIP telephony module 25 can load and execute in RAM 21. Once executing, the VoIP Enabled Speech Server 5 is configured to receive a voice call and subsequent data over a VoIP communications path.

The speech application 24 can include a speech recognition engine 34 and a text-to-speech engine 35. In operation, the VoIP Enabled Speech Server 5 can receive VoIP-compliant packets, reconstruct digitized audio data from the VoIP-compliant packets, and speech-to-text convert the digitized audio data in the speech recognition engine 34. Conversely, the speech application 24 can synthesize text into digitized audio data in the text-to-speech engine 35, encapsulate the digitized audio data in VoIP-compliant packets and transmit the VoIP-compliant packets through the VoIP communications path 18 to the VoIP telephony gateway server 3.

In the preferred embodiment, the speech application includes a speech browser 30. Notably, the speech browser 30 can retrieve Web content responsive to voice commands which are received through the VoIP communications path 18, speech-to-text converted by the speech recognition engine 34, and interpreted by the speech browser 30. Also, the speech browser 30 can transmit received Web content to the text-to-speech engine 35 for speech synthesis prior to transmitting the speech synthesized audio data through the VoIP communications path 18 to the VoIP telephony gateway server 3. Significantly, the Web content can be a VoiceXML document 8.

Preferably, the speech application can be implemented using standards-based interfaces to VoIP communications and the speech recognition and speech synthesis functions. Specifically, the speech application 24 can include a JSAPI speech interface 33 between the speech recognition and text-to-speech engines 34, 35 and the speech browser 30. Also, the speech application 24 can include a JTAPI telephony interface 31 between the telephony module 25 and the speech browser 30. Finally, the speech application 24 can include a JMF media interface 32 between the telephony module 25 and the speech browser 30.

The JTAPI telephony interface 31 can be used by the speech browser 30 to establish a voice call connection for transporting VoIP-compliant packets containing digital audio data between the telephony gateway server 3 and the speech application 24. The JMF media interface 32 can establish a VoIP communications data path for transporting the VoIP-compliant packets containing the digital audio data between the speech application 24 and the voice call connection. The JSAPI speech interface 33 can communicate the digitized audio data from the speech application 24 to the speech recognition engine 34. Similarly, the JSAPI speech interface 33 can communicate speech synthesized audio data from the text-to-speech engine 35 to the speech application 24.

The VoIP-based speech system of the present invention allows a user to access a Web site using a telephone. The user is audibly presented with prompts describing the Web site and the Web site's features. Thus, the presentation of the VoIP-based speech system is similar to an Integrated Voice Response system. During the presentation of the Web site, the user can provide spoken commands to the VOIP-based speech system in order to select options and input information for completing Web-based forms, etc. Advantageously, the VoIP-based speech system can retrieve Web content having, as its page description language, VoiceXML.

A significant element of the present invention is the speech server which can send and receive audio and control messages using H.323, a well-known, standard VoIP protocol. The use of the VoIP protocol permits speech server to remain isolated from other elements of the speech system and therefore allows the speech server to be better optimized. The use of an isolated speech server also simplifies considerably the development process, since it frees the speech server from the details of interacting with one of a multitude of available telephony hardware implementations. Finally, the use of an isolated VoIP enabled speech server allows the speech server to be used with any VoIP telephony system that supports the standard H.323 protocol, or other VoIP protocol, without any special development effort.

A VoIP-based speech system in accordance with the inventive arrangement has the advantage of isolating the speech server from the details of the telephony hardware and software in the telephony gateway server that interfaces with the telephone network. Additionally, the preferred embodiment of the present invention incorporates a standard protocol to transport audio and call control information to the speech server, thus simplifying and optimizing the design of the same. Also, the incorporation of a standard protocol to transport audio and call control information to the speech server allows the speech server to operate with a wide variety of telephony hardware and software that supports the standard VoIP protocol.

The present invention can include a method for coupling the speech application to the VoIP telephony gateway server. The method can be realized in hardware, software, or a combination of hardware and software. Machine readable storage according to the present invention can be realized in a centralized fashion in one computer system, or in a distributed fashion where different elements are spread across several interconnected computer systems. Any kind of computer system or other apparatus adapted for carrying out the methods described herein is acceptable. A typical combination of hardware and software could be a general purpose computer system with a computer program that, when being loaded and executed, controls the computer system such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form. The invention disclosed herein can be a method embedded in a computer program which can be implemented by a programmer using commercially available development tools for the operating system 23 described above.

What is claimed is:

1. A Voice over IP ("VoIP") based speech system comprising:
   an VoIP telephony gateway server;
   at least one speech server, each speech server containing a speech application;
   a VoIP-compliant call control interface between said VoIP telephony gateway server and said speech server; and,
   a VoIP communications path between said VoIP telephony gateway server and said speech application in said at least one speech server:
      said VoIP telephony gateway server and said speech application establishing said VoIP communications path through said VoIP-compliant call control interface;
      said VoIP telephony gateway server receiving audio signals from a telephony interface, digitizing said audio signals into digitized audio data, compressing said digitized audio data into VoIP-compliant packets and transmitting said VoIP-compliant packets to said speech application in said at least one speech server through said VoIP communications path using said VoIP protocol;
      said speech application in said at least one speech server receiving said VoIP-compliant packets, reconstructing said digitized audio data from said VoIP-compliant packets, and speech-to-text converting said digitized audio data;
      said speech application in said at least one speech server speech synthesizing text into digitized audio data, encapsulating said digitized audio data in VoIP-compliant packets and transmitting said VoIP-compliant packets through said VoIP communications path to said VoIP telephony gateway server;
      said VoIP telephony gateway server receiving said VoIP-compliant packets, reconstructing said digitized audio data from said VoIP-compliant packets, and transmitting said digitized audio data through said telephony interface.

2. The VoIP-based speech system of claim 1, wherein said VoIP telephony gateway server comprises:
   a telephony interface; and,
   a VoIP Gatekeeper;
      said VoIP Gatekeeper receiving a voice call through said telephony interface;
      said VoIP Gatekeeper choosing a speech server from among said at least one speech servers;
      said VoIP Gatekeeper alerting said VoIP-enabled speech application in said chosen speech server that said voice call has been received.

3. The VoIP-based speech system of claim 1, wherein said at least one speech server comprises:
   a speech recognition engine;
   a text-to-speech engine;
   a call control interface for establishing a voice call connection through said VoIP telephony gateway server; and,
   an audio data path,
      said audio data path streaming audio data through said established voice call connection to said speech recognition engine;
      said audio data path streaming audio data through said established voice call connection from said text-to-speech engine.

4. The VoIP-based speech system of claim 1, wherein said speech application is a speech browser, said speech browser retrieving Web content responsive to voice commands received through said VoIP communications path, said speech browser speech synthesizing said retrieved Web content into audio data, said speech browser transmitting said audio data through said VoIP communications path to said VoIP telephony gateway server.

5. The VoIP-based speech system of claim 4, wherein said Web content is a VoiceXML document.

6. The VoIP-based speech system of claim 1, wherein said at least one speech server comprises:
   a speech recognition engine;
   a text-to-speech engine;
   a JSAPI speech interface;
   a JTAPI telephony interface; and,
   a JMF media interface,
      said JTAPI telephony interface establishing a voice call connection for transporting digital audio data between said VoIP telephony gateway server and said speech application;
      said JMF media interface establishing a data path for transporting said digital audio data between said speech application and said voice call connection;
      said JSAPI speech interface communicating said digitized audio data from said speech application to said speech recognition engine;
      said JSAPI speech interface communicating speech synthesized audio data from said text-to-speech engine to said speech application.

7. A Voice over IP ("VoIP") enabled speech server comprising:
   a speech application, said speech application configured to communicate with a VoIP telephony gateway server over a VoIP communications path; and,
   a VoIP-compliant call control interface to said VoIP telephony gateway server, said VoIP-compliant call control interface establishing said VoIP communications path;
      said speech application receiving VoIP-compliant packets from said VoIP telephony gateway server over said VoIP communications path, reconstructing digitized audio data from said VoIP-compliant packets, and speech-to-text converting said digitized audio data.

8. The VoIP-enabled speech server of claim 7, said speech application synthesizing text into digitized audio data, encapsulating said digitized audio data in VoIP-compliant packets and transmitting said VoIP-compliant packets over said VoIP communications path to said telephony gateway server.

9. The VoIP-enabled speech server of claim 7, further comprising:
   a speech recognition engine;
   a text-to-speech engine; and,
   an audio data path,
      said audio data path streaming audio data through said established voice call connection to said speech recognition engine;

said audio data path streaming audio data through said established voice call connection from said text-to-speech engine.

10. The VoIP-enabled speech server of claim 7, wherein said speech application is a speech browser, said speech browser retrieving Web content responsive to voice commands received through said VoIP communications path, said speech browser speech synthesizing said retrieved Web content into audio data, said speech browser transmitting said audio data through said VoIP communications path to said VoIP telephony gateway server.

11. The VoIP-enabled speech server of claim 10, wherein said Web content is a VoiceXML document.

12. The VoIP-enabled speech server of claim 7, wherein said VoIP-compliant call control interface is a JTAPI telephony interface for establishing a voice call connection for transporting digital audio data between said VoIP telephony gateway server and said speech application.

13. The VoIP-enabled speech server of claim 12, further comprising:
    a speech recognition engine;
    a text-to-speech engine;
    a JSAPI speech interface; and,
    a JMF media interface,
        said JMF media interface establishing a data path for transporting said digital audio data between said speech application and said voice call connection;
        said JSAPI speech interface communicating said digitized audio data from said speech application to said speech recognition engine;
        said JSAPI speech interface communicating speech synthesized audio data from said text-to-speech engine to said speech application.

14. A method for coupling a speech application to a Voice over IP ("VoIP") telephony gateway server in a VoIP network comprising the steps of:
    establishing a VoIP communications path with the VoIP telephony gateway server and configuring the speech application to communicate with the VoIP telephony gateway server over the established VoIP communications path;
    receiving VoIP-compliant packets from the VoIP telephony gateway server over said established VoIP communications path;
    reconstructing digitized audio data from said VoIP-compliant packets; and,
    speech-to-text converting said digitized audio data.

15. The method of claim 14, further comprising the steps of:
    synthesizing text into digitized audio data;
    encapsulating said digitized audio data in VoIP-compliant packets; and,
    transmitting said VoIP-compliant packets over said VoIP communications path to the VoIP telephony gateway server.

16. The method of claim 14, further comprising the steps of:
    retrieving Web content responsive to speech recognized voice commands received through said VoIP communications path;
    synthesizing said retrieved Web content into audio data; and,
    transmitting said audio data through said VoIP communications path to the VoIP telephony gateway server.

17. The method of claim 16, wherein said Web content is a VoiceXML document.

18. A machine readable storage, having stored thereon a computer program for coupling a speech application to a Voice over IP ("VoIP") telephony gateway server in a VoIP network, said computer program having a plurality of code sections executable by a machine for causing the machine to perform the steps of:
    establishing a VoIP communications path with the VoIP telephony gateway server and configuring the speech application to communicate with the VoIP telephony gateway server over the established VoIP communications path;
    receiving VoIP-compliant packets from the VoIP telephony gateway server over said established VoIP communications path;
    reconstructing digitized audio data from said VoIP-compliant packets; and, speech-to-text converting said digitized audio data.

19. The machine readable storage of claim 18, for further causing the machine to perform the steps of:
    synthesizing text into digitized audio data;
    encapsulating said digitized audio data in VoIP-compliant packets; and,
    transmitting said VoIP-compliant packets over said VoIP communications path to the VoIP telephony gateway server.

20. The machine readable storage of claim 18, for further causing the machine to perform the steps of:
    retrieving Web content responsive to speech recognized voice commands received through said VoIP communications path;
    synthesizing said retrieved Web content into audio data; and,
    transmitting said audio data through said VoIP communications path to the VoIP telephony gateway server.

21. The machine readable storage of claim 20, wherein said Web content is a VoiceXML document.

* * * * *